United States Patent Office 2,830,055
Patented Apr. 8, 1958

2,830,055
CHLOROQUINAZOLINE DERIVATIVES

Gordon A. Grant, Mount Royal, and Stanley O. Winthrop, Montreal, Quebec, Canada, assignors to American Home Products Corporation, New York, N. Y., a corporation of Delaware No Drawing. Application May 7, 1956
Serial No. 582,925

11 Claims. (Cl. 260—256.4)

This invention relates to certain new chemical compounds and to the process by which they may be prepared. More particularly, our invention relates to quinazoline compounds which contain a chloro-substituent in the 6-position and a β-dialkylaminoethoxyethoxy group in the 4-position, which compounds possess valuable pharmacological properties including sedative activity.

Our new chemical compounds, when in the form of the free base, may be represented by the following generic formula:

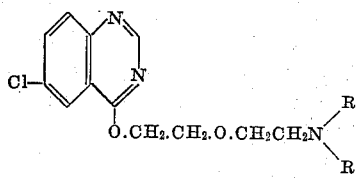

where R is lower alkyl. Since these compounds also exist in salt form, and possess pharmacological activity similar to that of the free base, our invention also includes compounds of this generic formula when in the form of their acid addition salts.

In preparing our new chemical compounds one equivalent of a β-dialkylaminoethoxyethanol as its sodio derivative may be reacted with one equivalent of 4,6-dichloroquinazoline. An excess of the β-dialkylaminoethoxyethanol serves as the reaction solvent. The β-dialkylaminoethoxyethoxy group is introduced on the quinazoline nucleus in the 4-position, the chloro-substituent in the 6-position remaining on the quinazoline ring.

The following examples are illustrative of our invention:

EXAMPLE 1

4-(β-dimethylaminoethoxyethoxy)-6-chloroquinazoline maleate 0.5 gram of metallic sodium (0.022 mole) was added to 13.3 grams (0.1 mole) of β-dimethylaminoethoxyethanol and the mixture warmed until all of the sodium had dissolved. On cooling 4 grams of 4,6-dichloroquinazoline (0.02 mole) were added portionwise, with continued cooling. The reaction was complete after the reaction mixture had stood overnight. It was then added to a large volume of water and the product extracted with chloroform. The chloroform extract was washed with water, dried and evaporated to a reduced volume at a pressure less than atmospheric. The excess β-dimethylaminoethoxyethanol was removed by distillation, yielding 4.3 grams of the high boiling base 4-(β-dimethylaminoethoxyethoxy)-6-chloroquinazoline. The yield was 72 percent of theoretical.

The base was then dissolved in ether and an ether solution of maleic acid was added thereto. 4-(β-dimethylaminoethoxyethoxy)-6-chloroquinazoline maleate precipitated as a salt of melting point 108–110° C. It was recrystallized from ethyl acetate, whereupon a pure salt of needle crystalline form and melting point 111–112° C. was secured. Analysis for carbon, hydrogen, nitrogen and chlorine confirmed the empiric structure $C_{18}H_{22}N_3O_6Cl$, as follows: C, 52.50; H, 5.39; N, 10.21; Cl, 8.62. Found: C, 52.26; H, 5.62; N, 10.30, 10.21; Cl, 8.65.

EXAMPLE 2

4-(β-dimethylaminoethoxyethoxy)-6-chloroquinazoline 1.6 grams of 4-(β-dimethylaminoethoxyethoxy)-6-chloroquinazoline maleate as prepared in Example 1 were dissolved in water and enough sodium carbonate added to neutralize the maleate. The free base, 4-(β-dimethylaminoethoxyethoxy)-6-chloroquinazoline, came out of solution as an oil. It is taken up in a little chloroform, washed with water, and the chloroform solution dried over sodium sulfate. Upon removal of the chloroform at a reduced pressure less than atmospheric, there was left behind a thick, light brown oil. This was dried under a high vacuum and submitted for analysis which confirmed the empiric formula $C_{14}H_{18}N_3O_2Cl$.

EXAMPLE 3

4-(β-diethylaminoethoxyethoxy)-6-chloroquinazoline dihydrogensulfate

Metallic sodium in the amount of 0.25 gram (0.011 mole) was added to 8 grams (0.05 mole) of β-diethylaminoethoxyethanol. The mixture was warmed until all of the sodium had gone into solution. After cooling the mixture to room temperature 2 grams (0.02 mole) of 4,6-dichloroquinazoline was added to the solution portionwise, with cooling. After the reaction mixture had stood overnight the reaction was completed.

The reaction mixture was added to a large volume of water and the product extracted therefrom with chloroform. The chloroform extract was washed with water, dried, and evaporated at a reduced pressure less than atmospheric. The excess basic alcohol was removed by distillation and the high boiling residue in the still was considered to be the crude product. The yield was 3.0 grams or 46 percent of theory.

The dihydrogensulfate salt was prepared by adding a solution of sulfuric acid in isopropanol to an ether solution containing the 4-(β-diethylaminoethoxyethoxy)-6-chloroquinazoline base. There was obtained 1.7 grams of the dihydrogensulfate salt, a representative sample of which melted at 136–137° C. The product was twice recrystallized from acetonitrile and gave a crystalline product of needle form which melted at 135–137° C. Analysis confirmed the empiric formula

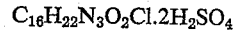

$C_{16}H_{22}N_3O_2Cl.2H_2SO_4$

Calc.: C, 36.90; H, 5.04; N, 8.08; Cl, 6.82; S, 12.31.
Found: C, 37.31, 37.57; H, 5.02, 5.44; N, 8.23, 8.25; Cl, 7.42, 7.07; S, 12.00, 12.29.

EXAMPLE 4

4-(β-diisopropylaminoethoxyethoxy)-6-chloroquinazoline hydrochloride

Metallic sodium in the amount of 0.5 gram (0.022 mole) was added to 19 grams (0.1 mole) of β-diisopropylaminoethoxyethanol and the solution warmed until all of the sodium had dissolved. After cooling, 4 grams (0.02 mole) of 4,6-dichloroquinazoline was added to the solution in successive portions, with cooling. After the reaction mixture had been allowed to stand overnight, reaction was considered complete and the mixture was added to a large volume of water. The product, 4-(β-diisopropylaminoethoxyethoxy)-6-chloroquinazoline, was extracted from the water solution with chloroform.

The chloroform extract was washed with water, dried, and evaporated at a reduced pressure less than atmospheric. The excess basic alcohol was then removed by distillation. The crude product, in the form of a high boiling residue, amounted to 3.7 grams or 53 percent of theory.

The hydrochloride salt was prepared by the addition of ethereal hydrogen chloride to the base. Two recrystallizations of the product from ethyl acetate gave the substantially pure product, 4-(β-diisopropylaminoethoxyethoxy)-6-chloroquinazoline hydrochloride, a representative sample of which melted at 123–125° C. Analysis confirmed the empiric formula $C_{18}H_{29}N_3O_2Cl_2$.

We claim:

1. A compound selected from the group which consists of basic esters of the generic formula:

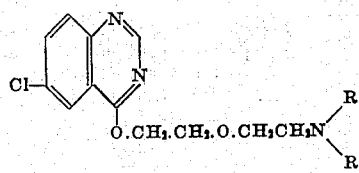

where R represents lower alkyl, and their hydrochloride, maleate and dihydrogensulfate salts.

2. A compound of the formula:

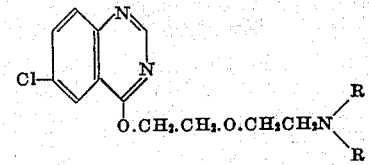

where R represents lower alkyl.

3. 4-(β-dimethylaminoethoxyethoxy)-6-chloroquinazoline.

4. 4-(β-diisopropylaminoethoxyethoxy)-6-chloroquinazoline.

5. 4-(β-dimethylaminoethoxyethoxy)-6-chloroquinazoline maleate.

6. 4-(β-diethylaminoethoxyethoxy)-6-chloroquinazoline dihydrogensulfate.

7. 4-(β-diisopropylaminoethoxyethoxy)-6-chloroquinazoline hydrochloride.

8. The process of preparing a compound of the formula

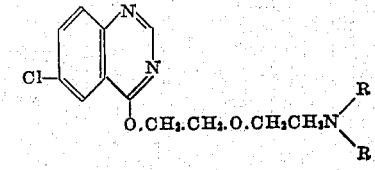

where R represents lower alkyl, which comprises bringing into mutual contact 4,6-dichloroquinazoline and an alcoholate of the formula

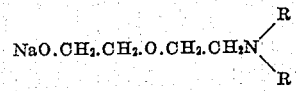

where R represents lower alkyl, said reactants being allowed to remain in contact with each other in a diluent comprising the alcohol corresponding to said alcoholate.

9. The process of preparing 4-(β-dimethylaminoethoxyethoxy)-6-chloroquinazoline which comprises bringing into mutual contact 4,6-dichloroquinazoline and an alcoholate of the formula

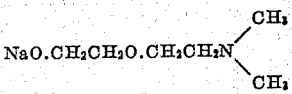

said reactants being allowed to remain in contact with each other in a diluent comprising the alcohol corresponding to said alcoholate.

10. The process of preparing 4-(β-diethylaminoethoxyethoxy)-6-chloroquinazoline which comprises bringing into mutual contact 4,6-dichloroquinazoline and an alcoholate of the formula

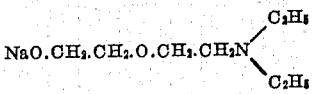

said reactants being allowed to remain in contact with each other in a diluent comprising the alcohol corresponding to said alcoholate.

11. The process of preparing 4-(β-diisopropylaminoethoxyethoxy)-6-chloroquinazoline which comprises bringing into mutual contact 4,6-dichloroquinazoline and an alcoholate of the formula

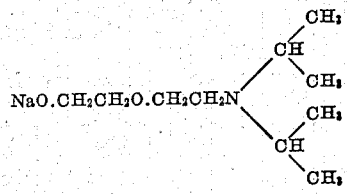

said reactants being allowed to remain in contact with each other in a diluent comprising the alcohol corresponding to said alcoholate.

No references cited.